United States Patent [19]

Bergman et al.

[11] 4,416,722

[45] Nov. 22, 1983

[54] SHEET BINDING

[75] Inventors: Carl A. Bergman, South Dartmouth; Roy L. Thomas; Richard A. Bourbeau, both of New Bedford, all of Mass.

[73] Assignee: Standard Duplicating Machines Corp., New Bedford, Mass.

[21] Appl. No.: 378,608

[22] Filed: May 17, 1982

[51] Int. Cl.³ .............................................. B32B 31/00

[52] U.S. Cl. .................................... 156/578; 118/204; 118/238; 156/908; 412/8; 412/37

[58] Field of Search ................ 156/908, 578; 118/204, 118/236, 238, 503, 244; 412/8, 37

[56] References Cited

U.S. PATENT DOCUMENTS

| | | | |
|---|---|---|---|
| 2,097,428 | 11/1937 | Bergstein | 118/204 |
| 3,146,127 | 8/1964 | Geoffrey et al. | 412/37 X |
| 3,244,436 | 4/1966 | McKowen | 156/908 X |
| 3,866,568 | 2/1975 | Minami | 118/238 |

*Primary Examiner*—David A. Simmons

[57] ABSTRACT

A sheet stack is bound by applying adhesive with a drum from which adhesive is wiped just before the stack arrives to prevent excess adhesive on its front edge. Other features include a sheet-aligning jog table that moves out of position before the stack reaches the drum, the use of separators between a plurality of stacks that travel past the drum simultaneously, and a bound stack of sheets with a cover having a small, folded-over portion adjacent to the stack.

11 Claims, 8 Drawing Figures

FIG 1
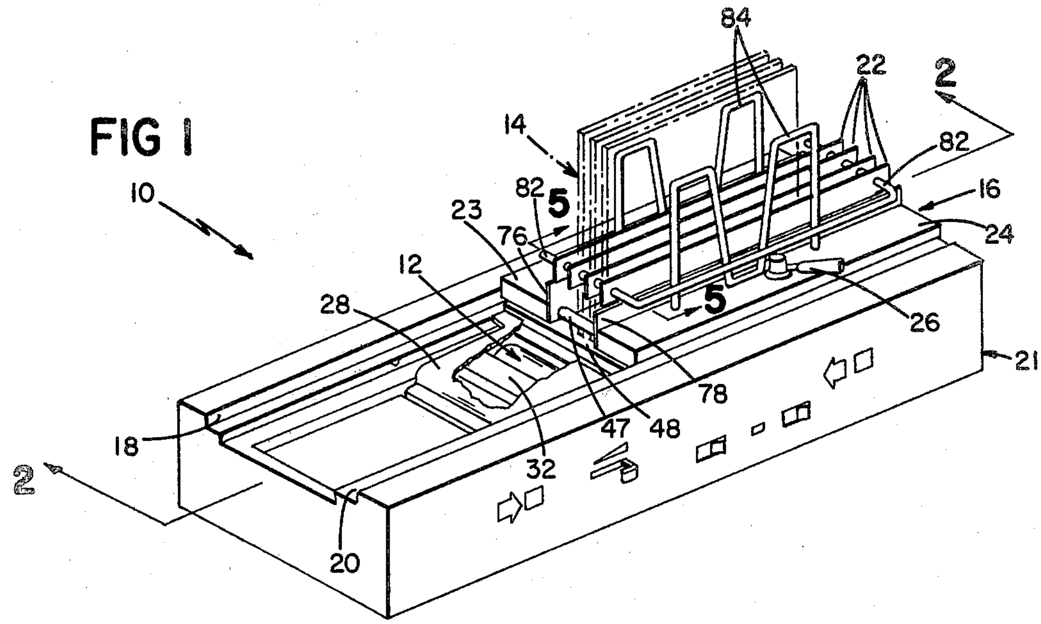
FIG 2
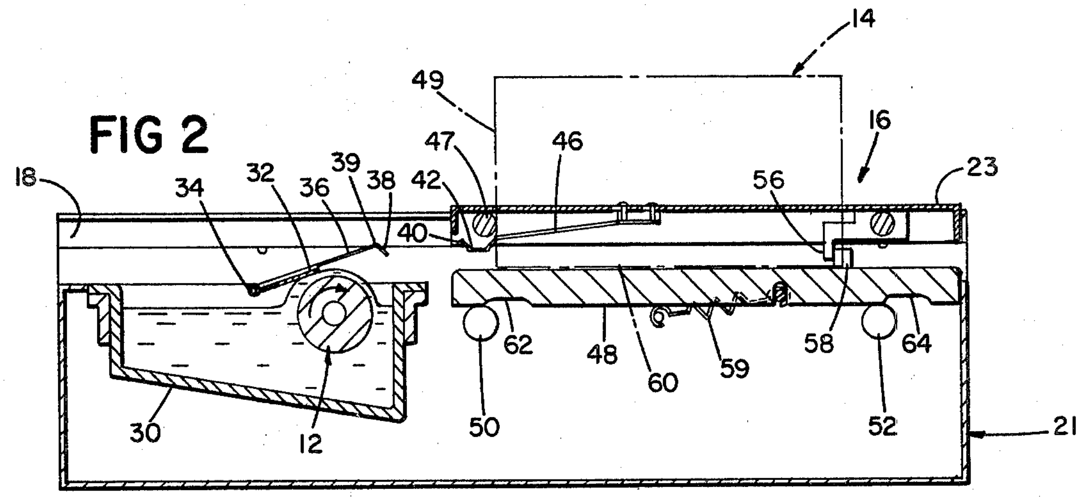
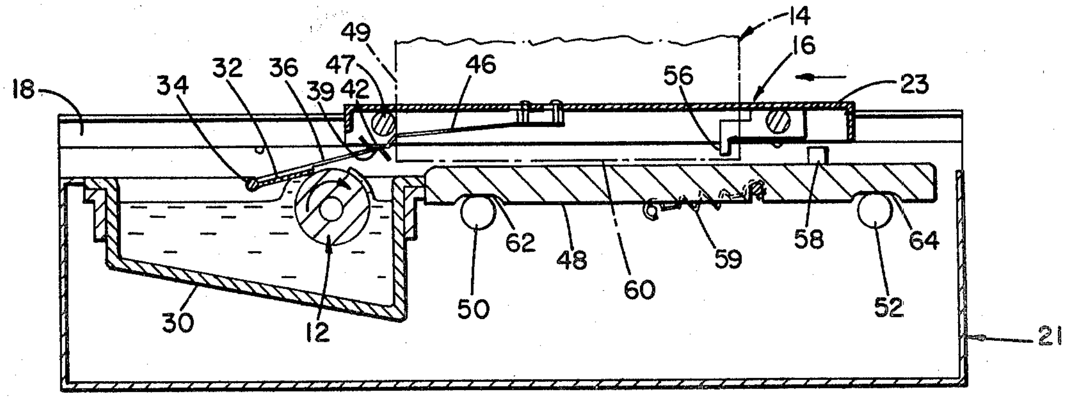
FIG 3

SHEET BINDING

FIELD OF THE INVENTION

The invention relates to apparatus for binding an edge of a stack of sheets.

BACKGROUND OF THE INVENTION

A stack of paper sheets can be bound together at an edge by applying a thermally flowable adhesive to the edge and permitting it to penetrate slightly into the stack of pages and harden. For example, Minami U.S. Pat. No. 3,866,568 discloses a machine for binding a stack of sheets by causing the lower edge of the stack to travel past the upper surface of a drum rotating in a tank of heated adhesive so that adhesive is applied to the lower edge of the stack; immediately before the front edge of the stack reaches the drum, the drum is temporarily lowered out of adhesive-applying position, to keep excess adhesive from the front edge of the stack of sheets.

SUMMARY OF THE INVENTION

In one aspect our invention features adhesive sheet-binding apparatus with means to wipe adhesive off of the surface of a rotating drum immediately prior to the arrival of the leading portion of a stack of sheets, to prevent excess adhesive on the front edge of the stack. In preferred embodiments, the wiping means is means to move a doctor blade on the drum toward the drum for a short period of time immediately prior to the arrival of the leading portion of the stack of sheets; the means to move the doctor blade is a lever arm extending from the doctor blade to a position above the upper surface of the drum so that as the carriage with the stack of sheets travels over the drum, the lever is temporarily depressed, thereby moving the doctor blade toward the drum; both the end of the lever arm and a contacting member on the bottom surface of the carriage have inclined surfaces to cause downward movement of the end of the lever arm as the carriage travels over it; the contact member on the carriage can be adjusted laterally to adjust the timing of the wiping action of the doctor blade. In an alternative embodiment, the contact member on the carriage has a plurality of inclined surfaces for contacting the lever arm so that the lever arm moves up and down against the rotating drum surface to vary the thickness of adhesive along the lower edge of the stack of sheets.

In another aspect, our invention features a jog table located adjacent to the tank for the rotatable drum and underneath the sheet-carrying carriage when the carriage is in its position prior to travel past the drum. The jog table supports the lower edge of the stack of pages prior to application of the adhesive, and it is movably mounted to move downward prior to travel of the paper past the rotating drum. The jog table thus permits alignment of the edges of the sheets in the stack, and then moves out of position to reduce drag on the stack of sheets during their travel past the rotating drum. In preferred embodiments, the table moves forward and downward during initial travel of the carriage; rollers and cam surfaces are used to provide the forward and downward travel of the jog table; the jog table has cam surfaces at its bottom, and the frame of the binding apparatus supports the rollers; there are means to bias the jog table toward the drum, and mating protuberances on the upper surface of the jog table and on the lower surface of the carriage, to hold the jog table back prior to travel of the carriage, and to permit travel of the jog table with the carriage.

In another aspect, our invention features providing the traveling carriage with separators so that a plurality of stacks of sheets can be carried by the carriage past the rotating drum at one time. The separators are supported by the carriage and have lower ends that are spaced above the upper surface of the drum. In preferred embodiments, the separators have holes through them, and they are supported by horizontal rods that pass through the holes and are carried by the carriage; and the horizontal rods are supported by vertical members that are removably mounted on the carriage.

In another aspect, our invention features a bound stack of sheets with a cover that has a small folded-over portion at one end with the adhesive penetrating into the crease of the folded-over edge and the edges of the sheets and between the sheets. In use, the crease in the cover acts as a hinge instead of the adhesive, to maintain the integrity of the adhesive binding. In a preferred embodiment, there are two such covers, one on each face of the stack of sheets.

DESCRIPTION OF THE PREFERRED EMBODIMENT

We now turn to description of the structure and operation of the presently preferred embodiment of the invention after first briefly describing the drawings.

DRAWINGS

FIG. 1 is a perspective view, partially broken away, of apparatus for binding the edges of a stack of pages according to the invention.

FIG. 2 is a diagrammatic, vertical sectional view, taken at 2—2 of FIG. 1, of the FIG. 1 apparatus with some of its components in an initial position.

FIG. 3 is a view similar to FIG. 2 with some of its components in different positions.

STRUCTURE

Figure 4:
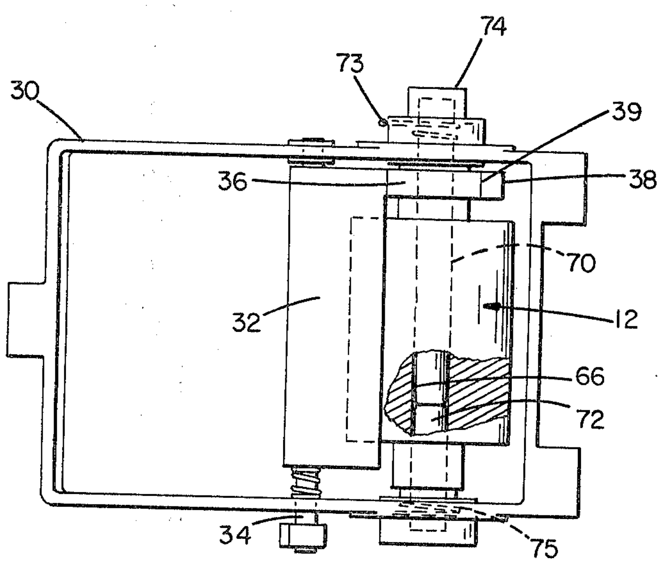
FIG. 4 is a diagrammatic plan view, partially broken away, of adhesive-applying components of the FIG. 1 apparatus.

Referring to FIG. 1, there is shown binding apparatus 10 for applying a thermally flowable adhesive on the surface of rotatable drum 12 to the lower edges of stacks of sheets 14 as they travel in carriage 16 over the upper surface of drum 12. Carriage 16 is slidably mounted to travel along tracks 18 and 20 on frame 21, and has separators 22 mounted on it to separate stacks of sheets 14. Portion 24 of carriage 16 is movable toward portion 23 in a direction transverse to the axes of tracks 18, 20, to facilitate insertion of stacks of sheets 14, and has locking lever arm 26, to lock member 24 in place. Carriage 16 also has cover plate 28 on its front end to cover drum 12, which is heated in use, when carriage 16 is in its resting position.

Referring to FIGS. 2, 3, and 4, it is seen that drum 12 is mounted within heated adhesive tank 30 and extends slightly above the top of tank 30. Doctor blade 32 is pivotally mounted about shaft 34, and lever arm 36 is attached to one end of blade 32 (FIG. 4). Lever arm 36 has inclined ramp portion 38 and top portion 39 for contact with inclined portion 40 and lower surface 42 of contact member 46, adjustably attached to the bottom of portion 23 of carriage 16.

In FIG. 2, jog table 48 is shown adjacent to tank 30 and underneath carriage 16, in its initial position. Jog table 40 is supported by rollers 50, 52, mounted on frame 21, and is restrained from travel to the left by interference of protuberance 56, extending downward from the lower portion of carriage 16, with protuberance 58, on jog table 48.

In FIG. 3, carriage 16 is shown in a position immediately prior to arrival of the leading portion of lower edges 60 of stacks 14 at the upper surface of drum 12. Jog table 48 is in a position forward of and lower than that shown in FIG. 2, and the center, elevated portions of cam surfaces 62, 64 are resting on rollers 50, 52. Doctor blade 32 has been pivoted into position against the surface of drum 12, because lever 36 has been moved downward by contact member 46.

In FIG. 4, the construction and mounting of drum 12 in heated adhesive tank 30 are shown in detail. Drum 12 is solid aluminum and has an electrochemically-reduced aluminum oxide coating impregnated with fluorocarbon resins (provided by Sanford Process Corporation, Natick, MA under the trade designation "Sanford Hard Lube") to provide lubrication and wear resistance to both the outer and inner surfaces. Within bore 66 of drum 12 are mounted tightly-fitting, cylindrical heating cartridge 70 and thermostat cartridge 72. Springs 73, 75 are connected to cartridges 70, 72, and have hooked ends attached to fixed members of the machine to provide limited movement of cartridges 70, 72 with drum 12 against the forces of the springs. End 74 of drum 12 is connected to drive means (not shown).

Figure 5:
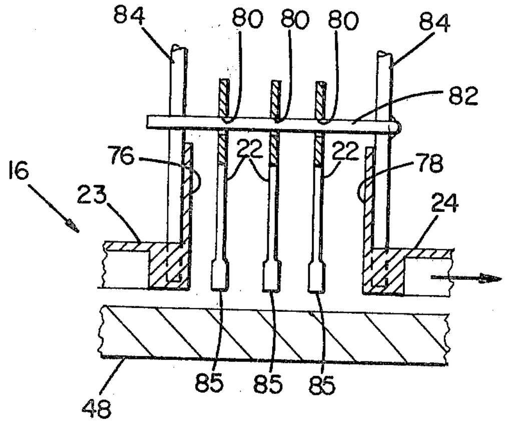
FIGS. 5 and 6 are vertical sectional views, taken at 5—5 of FIG. 1, of separator components of the FIG. 1 apparatus, both before and during use.

Referring to FIG. 5, separators 22 are shown suspended on carriage 16 between clamping surfaces 76, 78. Separators 22 each have holes 80, through which rods 82 (one at the front and one at the back) pass. Rods 82 are supported by vertical members 84, which are removably mounted on portion 24 of carriage 16. Lower ends 85 of separators 22 are about ¼" wide, and are positioned to travel above jog table 48 and the adhesive on rotating drum 12.

Figure 6:
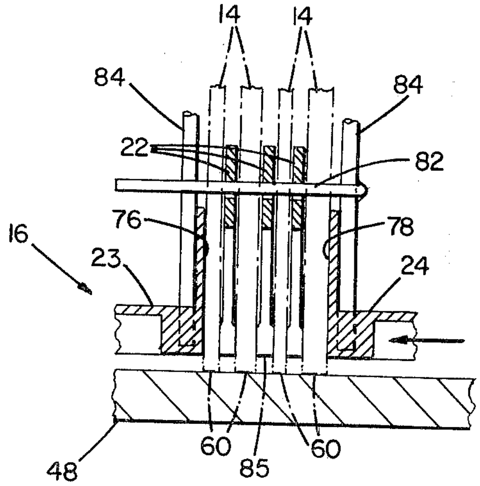

In FIG. 6 stacks of sheets 14 are shown compressed between separators 22 with member 24 of carriage 16 locked into position.

Figure 7:
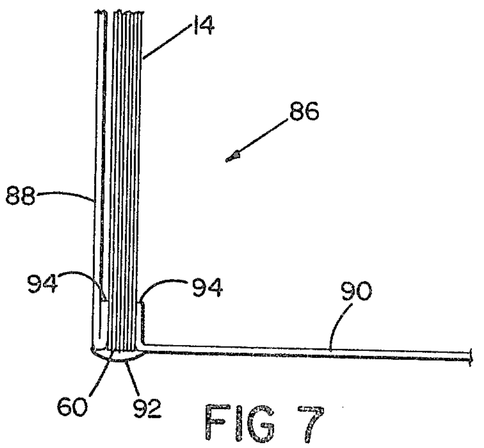
FIG. 7 is a top view of a covered and bound stack of sheets according to the invention.

In FIG. 7 bound book 86 is shown. It is made of stack of sheets 14 and two covers 88, 90, all adhered together by hardened adhesive 92 at the edge with small folded-over portions 94 of covers 90.

OPERATION

In operation, carriage 16 is initially in the position shown in FIGS. 1 and 2, and portion 24 of carriage 16 is spaced from portion 23, as shown in FIG. 5. Stacks of sheets 14 are placed between separators 22 and clamping surfaces 76, 78, and lower edges 60 are supported by jogging table 48 and are thus aligned with each other. Front edge 49 of the stack is placed against transverse bar 47. Portion 24 is moved toward portion 23 and locked into position with the proper compression, as is shown in FIG. 6, by moving lever 26. Machine 10 is then activated, and carriage 16 travels along tracks 18, 20 so that lower edges 60 pass through, and pick up, the adhesive on the upper surface of rotatable drum 12. During this travel, drum 12 rotates in a clockwise manner (FIG. 2), opposing the travel of stacks of sheets 14. Carriage 16 travels at approximately 2 inches per minute, and the peripheral speed of drum 12 is 38% faster than the linear speed of carriage 16.

Referring to FIGS. 2 and 3, it is seen that when carriage 16 and jog table 48 are in the initial position (FIG. 2), table 48 is in a high position on top of rollers 50, 52, and is restrained from movement to the left, owing the interaction of protuberances 56, 58. In this position the upper surface of jog table 48 is 0.01" lower than the upper surface of drum 12. As carriage 16 moves to the left, inclined surface 40 of contact member 46 slides over inclined surface 38 of lever 36, thereby pushing lever 36 and doctor blade 32 down so that doctor blade 32 wipes adhesive off of the surface of drum 12. Also, as carriage 16 moves to the left, table 48 is moved forward by spring 59 at the same lateral velocity as carriage 16, and, owing to the shapes of cam surfaces 62, 64, jog table 48 also moves downward to the position shown in FIG. 3, while stacks of sheets 14 remain supported by carriage 16, thereby permitting travel of stacks of sheets 14 without friction from dragging on table 48. In this position, table 48 is about 1/16" below that shown in FIG. 2. As carriage 16 moves further to the left, lever arm 36 is no longer depressed by contact member 46, and doctor blade 32 raises, thereby permitting a controlled layer of adhesive on the upper surface of drum 12. A short time later, the leading portions of lower edges 60 of stacks of sheets 14 arrive at the upper surface of drum 12 in synchronization with the arrival of adhesive on drum 12, so that adhesive is not applied on front edge 49 of stacks of sheets 14. Carriage 16 continues moving to the left with lower edges 60 passing through adhesive on drum 12. The proper amount of adhesive is determined by the position of doctor blade 32 (which is adjustable by means not shown) and the speed of rotation of drum 12. The synchronization of the arrival of the adhesive on drum 12 with the arrival of the leading portion of lower edges 60 can be adjusted by moving contact member 46 to the right or left.

Drum 12 is maintained at the proper temperature by heating cartridge 70 and thermostat cartridge 72. Because drum 12 is solid aluminium and fits tightly around heating cartridge 70, it conducts heat very well. Because drum 12 has a lubricating surface, it slides over cartridges 70, 72, and because the surface is wear resistant, it slides past doctor blade 32 without harmful wear.

The folded-over construction of covers 90 permits a good binding to form with the adhesive in the crease of the covers, and also permits opening the covers easily and without deforming the adhesive, as is shown by the open cover on the right side of FIG. 7.

OTHER EMBODIMENTS

Figure 8:
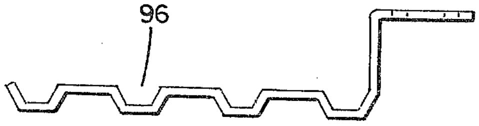
FIG. 8 is an elevation of an alternative contact member for the FIG. 1 apparatus.

Other embodiments of the invention within the scope of the appended claims will become apparent to those of skill in the art. For example, contact member 46 can be replaced by contact member 96, shown in FIG. 8, so that there will be varying thickness of adhesive on drum 12 and along edges 60 of stacks of sheets 14.

What is claimed is:

1. Apparatus for binding an edge of a stack of sheets comprising a frame, a drum rotatably mounted on an adhesive tank on said frame, a doctor blade pivotally mounted to adjust the amount of adhesive on an upper surface of said drum, a carriage slidably mounted to travel along a carriage axis transverse to the axis of said drum and above the upper surface of said drum, said carriage including means to engage said stack of sheets so that during travel of said carriage past said drum, the lower edge of said stack is carried past the upper surface of said drum, and wiping means to wipe adhesive off of the surface of said drum immediately prior to the arrival of the leading portion of said lower edge of said stack during travel of said carriage along said carriage axis, to keep excess adhesive from the front edge of said stack of pages, said wiping means comprising means to move said doctor blade toward said drum immediately prior to the arrival of the leading portion of said lower edge of said stack of pages during the travel of said carriage, said means to move said doctor blade comprising a lever attached to said doctor blade with a portion extending above the upper surface of said drum, said carriage having a contact member positioned to push down said lever during travel of said carriage along said carriage axis.

2. The apparatus of claim 1 wherein said lever and said contact member both have inclined surfaces that slide against each other during travel of said carriage along said carriage axis.

3. The apparatus of claim 2 wherein said contact member is adjustably mounted on said carriage to permit synchronization of the wiping action of said doctor blade with the arrival of said leading portion of said lower edge of said stack of sheets.

4. The apparatus of claim 1 wherein said contact member has a plurality of inclined portions along its length along said carriage axis to vary the thickness of adhesive along said lower edge of said stack of sheets.

5. Apparatus for binding edges of a plurality of stacks of sheets comprising a frame, a drum rotatably mounted on an adhesive tank on said frame, a doctor blade pivotally mounted to adjust the amount of adhesive on an upper surface of said drum, a carriage slidably mounted to travel along a carriage axis transverse to the axis of said drum and above the upper surface of said drum, said carriage including means to engage said stacks of pages so that during travel of said carriage past said drum, the lower edges of said stacks are carried past the upper surface of said drum, a jog table positioned adjacent to said rotatable drum and under said carriage, when said carriage is in its initial position prior to travel past said drum, and movably mounted to move downward prior to travel of said stack of sheets past said drum along said carriage axis, at least one separator supported by said carriage to separate said plurality of stacks of sheets carried by said carriage, the lower end of each said separator being spaced above the upper surface of said jog table and the upper surface of said drum, each said separator having holes through it, and transverse rods mounted on said carriage and passing through said holes to support said separators.

6. The apparatus of claim 5 wherein said transverse rods are supported by vertical members that are removably mounted on said carriage.

7. Apparatus for binding an edge of a stack of sheets comprising a frame, a drum rotatably mounted on an adhesive tank on said frame, a doctor blade pivotally mounted to adjust the amount of adhesive on an upper surface of said drum, a carriage slidably mounted to travel along a carriage axis transverse to the axis of said drum and above the upper surface of said drum, said carriage including means to engage the stack of sheets so that during travel of said carriage past said drum, the lower edge of said stack is carried past the upper surface of said drum, and a jog table positioned adjacent to said rotatable drum and under said carriage, when said carriage is in its initial position prior to travel past said drum, and movably mounted to move downward prior to travel of said stack of sheets past said drum along said carriage axis.

8. The apparatus of claim 7 wherein said jog table is mounted to move forward and downward during initial travel of said carriage along said carriage axis.

9. The apparatus of claim 8 wherein said jog table is mounted on said frame by means of rollers and contacting cam surfaces on said apparatus.

10. The apparatus of claim 9 wherein said cam surfaces are on said jog table, and said rollers are mounted on said frame.

11. The apparatus of claim 10 further comprising means to bias said jog table toward said drum, and protuberances on said carriage and on said jog table to prevent travel of said jog table toward said drum, except when said carriage moves along said carriage axis.

* * * * *